J. Alexander,
Pattern for Casting.
N° 25,157. Patented Aug. 16, 1859.

Witnesses.
R. Macfarlane
Alex. Harris

Inventor
John Alexander

UNITED STATES PATENT OFFICE.

JOHN ALEXANDER, OF BROOKLYN, NEW YORK, ASSIGNOR TO HIMSELF AND JAMES RITCHIE, OF SAME PLACE.

IMPROVEMENT IN PATTERNS FOR MOLDING.

Specification forming part of Letters Patent No. 25,157, dated August 16, 1859.

*To all whom it may concern:*

Be it known that I, JOHN ALEXANDER, of Brooklyn, in the county of Kings and State of New York, have invented a new and useful Improvement in Patterns for Molding or Casting Hollow Ware, Pipes, and the like; and I do hereby declare that the following is a full, clear, and exact description of the same, reference being had to the accompanying drawings, forming a part of this specification, in which—

Figure 1:
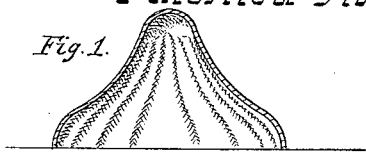
Figure 2:
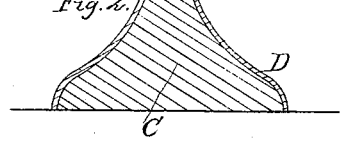
Figure 3:
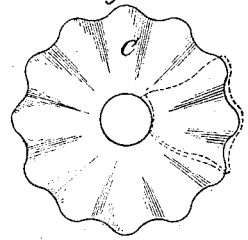
Figure 7:
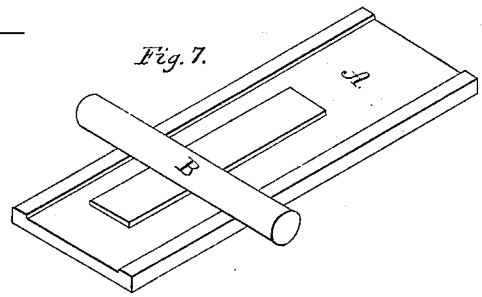
Figure 4:
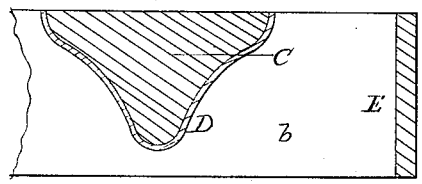
Figure 5:
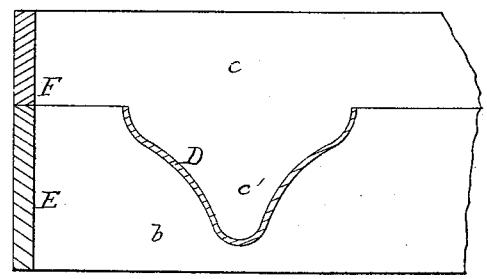
Figure 6:
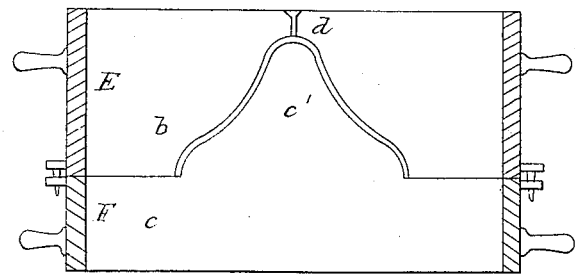

Figure 1 is a vertical central section of a cast-metal vessel or shell cast in a mold formed according to my invention. Fig. 2 is a vertical central section of a "former" with the pattern adjusted thereon. Fig. 3 is a plan or top view of the former with a small portion of the pattern placed thereon. Fig. 4 is an inverted side sectional view of the upper flask with the pattern and former packed within it. Fig. 5 is a side sectional view of both flasks adjusted together and inverted, the former being removed and the core occupying its place. Fig. 6 is a side sectional view of both flasks adjusted together, with the pattern removed and the flasks placed in a proper upright position to receive the melted metal. Fig. 7 is a perspective view of a gage-board and roller for forming the sections of the pattern of uniform thickness.

Similar letters of reference indicate corresponding parts in all of the above figures.

The object of this invention is to avoid the tedious and expensive work attending the making of wooden patterns for the casting of hollow ware, pipes, &c.; and the invention consists in employing a former which may be made of wood, plaster-of-paris, or other suitable substance, the exterior of the former corresponding in shape to the work to be cast, and equal in dimensions to its interior. On this former are placed layers of clay, wax, or other suitable plastic material of uniform thickness, said layers of clay or wax constituting the pattern by which, in connection with the former, the mold is produced, and the manipulation being as follows:

In carrying out this invention and improvement the first essential requisite is to form the clay, wax, or other plastic substance of which the pattern proper is constructed into layers of equal or uniform thickness. This may be effected by means of a gage-board or plate and roller, which are shown in Fig. 7.

A represents the board or plate which has a smooth upper surface, and a cleat or ledge, *a*, at each side, the said cleats or ledges projecting upward above the surface of the board or plate a distance equal to the desired thickness of the pattern. The upper surfaces of the cleats or ledges form bearing-surfaces for the roller B, and portions of the clay, wax, or other substance, being placed on the board or plate A, are rolled out in layers of uniform thickness, the roller B being passed over it by hand.

Other devices may be used for forming the pattern stock or material into layers of a uniform thickness; but the above-described device is simple and efficient.

The next essential requisite in the prosecution of the work is what I term a "former." This may be constructed of wood, plaster-of-paris, or any suitable material or substance, and its dimensions are equal to the interior of the castings to be made, its form corresponding to the external form of the castings. In other words, the former is a fac-simile of the external part of the casting, with the exception that it is less in dimensions, the difference in size corresponding to the thickness of the casting. This former may be very readily constructed, as it is not necessarily hollow, and hence there is no internal form to be given to it, the external form being the only requisite. A view of a former, C, is shown in Figs. 2, 3, and 4, the said former corresponding in shape and dimensions with the interior of the casting shown in Fig. 1, which is a fluted conical shell or vessel. The former being constructed, it may be covered with two or more coats of shellac spirit varnish, which speedily dries. The operator then takes the pattern stock or material which has been previously rolled into layers of a uniform thickness on the gage-board or plate A, as already described, and he completely covers the former, the internal surface of the pattern-stock being sprinkled with powdered charcoal or other suitable substance to prevent the too great adhesion of the stock to the former, for the reason hereinafter stated. The pattern-stock is placed evenly on the former C by a trowel or any proper tool, so as to form a complete covering of equal thickness, and said stock (which is shown by the red tint D) may be cut into strips of varying sizes and forms, in order to facilitate the work, the said strips being united into a smooth common mass by the action of the trowel, the plastic nature of the stock permitting such result. When the former C is covered with the pattern-stock D, the latter is coated with two or more coats of shellac spirit varnish. The pattern is then formed and the mold produced as follows: The former C, with the pattern D upon it, is placed in an upright position, and covered by a flask, E, and molding-sand $b$ is packed around it. The flask and its contents are then inverted, as shown in Fig. 4, and the flask is faced or smoothed off at the base of the former, and the latter removed or withdrawn from the pattern, the sprinkling of the interior of the pattern-stock with charcoal-dust, as previously mentioned, favoring this operation. The interior of the pattern is now coated with two or more layers of lac varnish, which, when dry, render it stiff and ready for molding the core. When the former is withdrawn and the pattern coated with varnish, a flask, F, is placed on flask E, and filled with sand $c$, the latter filling the interior of the pattern D, and forming a core, $c'$. (See Fig. 5.) The flask F is then removed from the flask E, the pattern D withdrawn, and the flask F replaced. Both flasks are then inverted, as shown in Fig. 6, a proper vent, $d$, is made, and the mold is ready for use.

From the above description it will be readily seen that the expense of forming molds for casting hollow ware is greatly reduced when the labor of forming the patterns is taken into consideration, for in molding for castings patterns have been hitherto required of a form corresponding to the castings, and the making of these is attended with great expense, for such as my method is designed to supersede, as it requires much time, labor, and great mechanical skill to construct a thin wooden shell or pattern when it is hollow, curved, or fluted, and it is scarcely possible to make one of equal thickness throughout. By my invention this uncertainty is avoided, as the pattern D may be very quickly formed, and although comparatively fragile, in itself considered, the former C prevents the contingency of breakage when the sand is packed within the flask E. It will then be seen that the former C performs a double function—to wit, that of a former to produce the pattern, and of a support for the same during the manipulation of molding.

I am aware that molds have been obtained for casting fac-similes of coins and other articles by coating the same with dissolved gum, several coats being placed one over the other, each coat being allowed to dry before the succeeding one is applied, and when a layer of sufficient thickness is obtained said layer being removed, and forming a mold. Plastic substances—such as plaster-of-paris—have also been used for such purpose. This, however, is quite different from my invention, as in the former case a mold is formed of the dissolved or plastic substance, and not a pattern, as in my invention.

I am not aware that a plastic substance has been used in connection with a former to produce a pattern for constructing molds in sand, and using the former in connection with the pattern during the manipulation of molding. I therefore do not claim, broadly, the employment or use of a plastic substance for producing molds for casting, irrespective of the former C, and the pattern D, formed and placed thereon; but What I do claim as new, and desire to secure by Letters Patent, is—

The employment or use of a former, C, with a pattern, D, constructed of a plastic substance, and formed on or over the former C, substantially as described, to produce molds in sand for the casting of hollow ware and other castings of the exact thickness required.

JOHN ALEXANDER.

Witnesses:
 ROBERT MACFARLANE,
 ALEXANDER HARRIS.